United States Patent
Ovard et al.

(10) Patent No.: US 7,260,109 B1
(45) Date of Patent: Aug. 21, 2007

(54) HIGH BANDWIDTH LEGACY COMPATIBLE MULTIPLEXER FRAMING FORMATS

(75) Inventors: Craig G. Ovard, Sandy, UT (US); Roger K. Peterson, Stansbury Park, UT (US); Steven D. Barber, Bountiful, UT (US)

(73) Assignee: L-3 Communications Corporation, New York, NY (US)

( * ) Notice: Subject to any disclaimer, the term of this patent is extended or adjusted under 35 U.S.C. 154(b) by 998 days.

(21) Appl. No.: 10/368,846

(22) Filed: Feb. 19, 2003

(51) Int. Cl.
*H04J 3/16* (2006.01)

(52) U.S. Cl. .................................. 370/466; 370/476

(58) Field of Classification Search ............... None
See application file for complete search history.

(56) References Cited

U.S. PATENT DOCUMENTS 5,740,517 A * 4/1998 Aoshima .................. 340/7.34

* cited by examiner

*Primary Examiner*—Bob A. Phunkulh
(74) *Attorney, Agent, or Firm*—Harrington & Smith, PC

(57) ABSTRACT

A communication multiplexer device is provided. The multiplexer device includes a legacy port adapted to communicate a legacy data frame format having at least one major data frame. The legacy major data frame includes overhead fields which may include a sync field. The legacy major data frame also includes three minor frame groups, where each of the minor frame group includes minor frames having subframe formats. The multiplexer also includes a contemporary port adapted to communicate a contemporary data frame format; and a translator coupled between the legacy port and the contemporary port for translation between the legacy data frame format and contemporary data fame format.

9 Claims, 4 Drawing Sheets

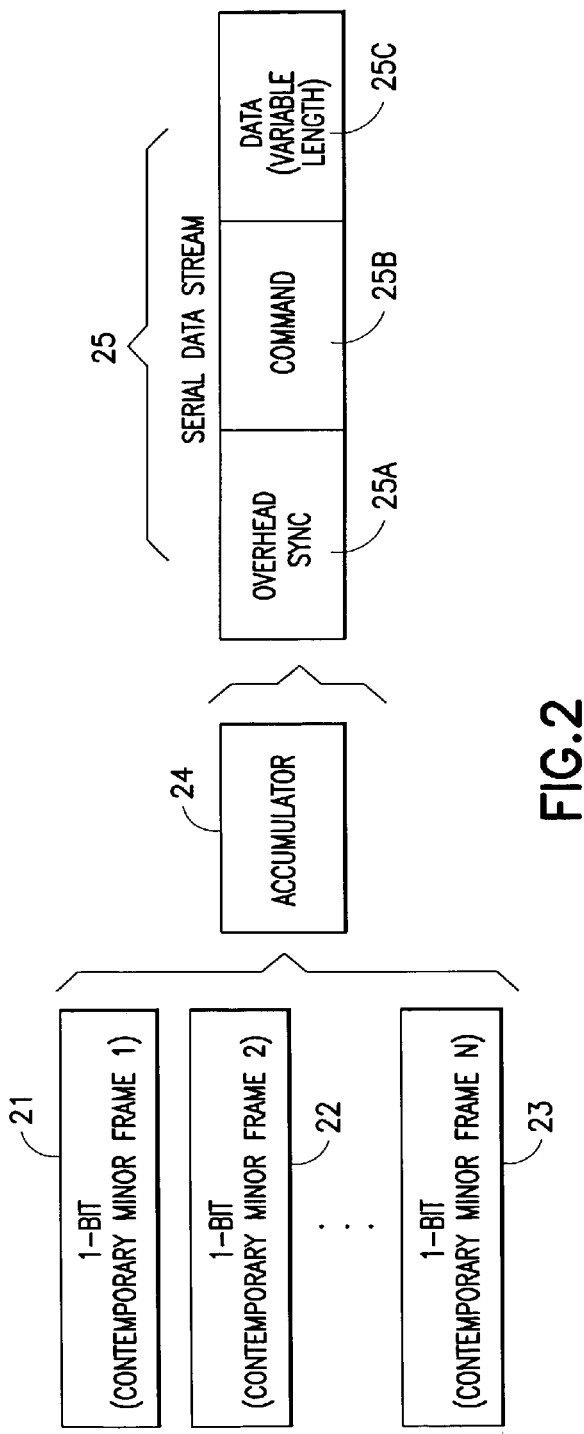
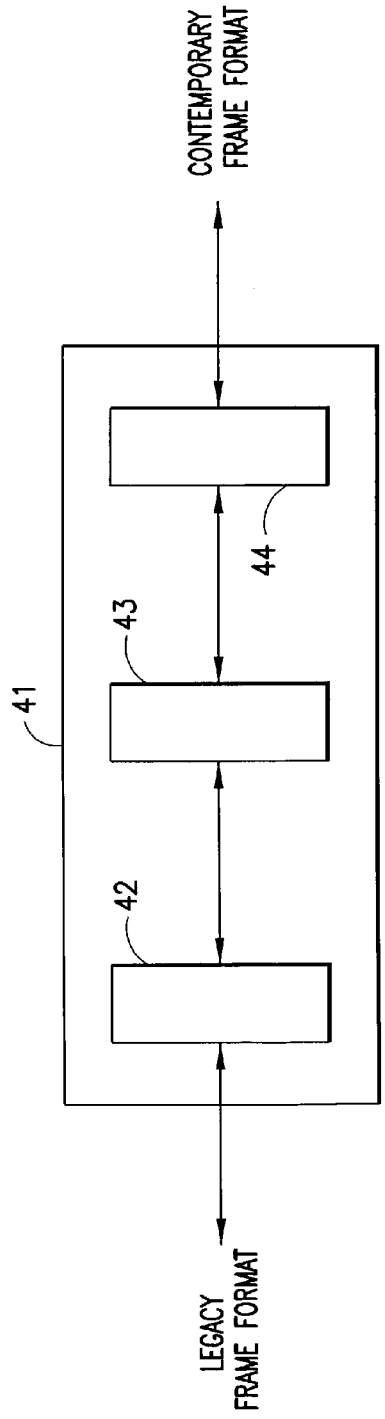
FIG.2
FIG.4

|  | KBITS/SEC Kb/s | SUBFRAME 1 BITS | SUBFRAME 2 BITS | SUBFRAME 3 BITS | SUBFRAME 4 BITS | SUBFRAME 5 BITS |
|---|---|---|---|---|---|---|
| DV | 16 | 2 | 0 | 0 | 0 | 0 |
| DU | 16 | 2 | 0 | 0 | 0 | 0 |
| USER 1 | 576 | 0 | 18 | 18 | 18 | 18 |
| USER 2 | 288 | 0 | 9 | 9 | 9 | 9 |
| USER 3 | 1152 | 0 | 36 | 36 | 36 | 36 |
| USER 4 | 0 | 0 | 0 | 0 | 0 | 0 |
| USER 5 | 64 | 1 | 2 | 2 | 2 | 2 |
| USER 6 | 72 | 0 | 2 | 2 | 2 | 2 |
| USER 7 | 128 | 0 | 4 | 4 | 4 | 4 |
| USER 8 | 512 | 0 | 16 | 16 | 16 | 16 |
| TOTALS | 2824 | 5 | 87 | 87 | 87 | 87 |

FIG.3A

HIGH BANDWIDTH LEGACY COMPATIBLE MULTIPLEXER FRAMING FORMATS

BACKGROUND OF THE INVENTION

1. Field of the Invention

This invention relates to communications between new equipment and legacy equipment; and, more particularly, to new framing formats that are backwards compatible with the legacy equipment.

2. Prior Art

New communication multiplexer framing devices and multiplexer software applications are continuously being developed and produced to operate within the higher data rates and bandwidths provided by improved technology. However, due to an incompatibility between data formats, older devices and software applications (often referred to as legacy systems) are not generally capable of communicating with newer communication multiplexer framing devices and multiplexer software applications. Thus, a new robust data format that is able to exploit higher data rate capacity must also be backwards compatible with the legacy systems.

It is therefore desirable to provide a multiplexer framing format system and method with backwards compatibility with legacy systems.

SUMMARY OF THE INVENTION

The foregoing and other problems are overcome, and other advantages are realized, in accordance with the presently preferred embodiments of these teachings.

In accordance with one embodiment of the present invention a communication multiplexer device is provided. The communication multiplexer device includes a legacy port configured to communicate with a legacy communication device; and a contemporary port configured to communicate with a contemporary communication device.

In accordance with another embodiment of the present invention, a contemporary framing format for high data rate communication while retaining backwards compatibility with legacy framing formats is provided. The contemporary framing format includes contemporary-subframes substantially identical to corresponding legacy subframe formats.

BRIEF DESCRIPTION OF THE DRAWINGS

The foregoing aspects and other features of the present invention are explained in the following description, taken in connection with the accompanying drawings, wherein:

FIG. 2 is a block diagram of an accumulator accumulating data within multiple 1-bit fields to form a serial data stream in accordance with the features of the present invention shown in FIG. 1;

FIG. 3A is a table representing multiple user data rate distribution across a subframe format within a minor frame;

FIG. 4 is a block diagram of a multiplexer showing a translator between contemporary and legacy ports.

DETAILED DESCRIPTION OF THE PREFERRED EMBODIMENTS

Figure 1:
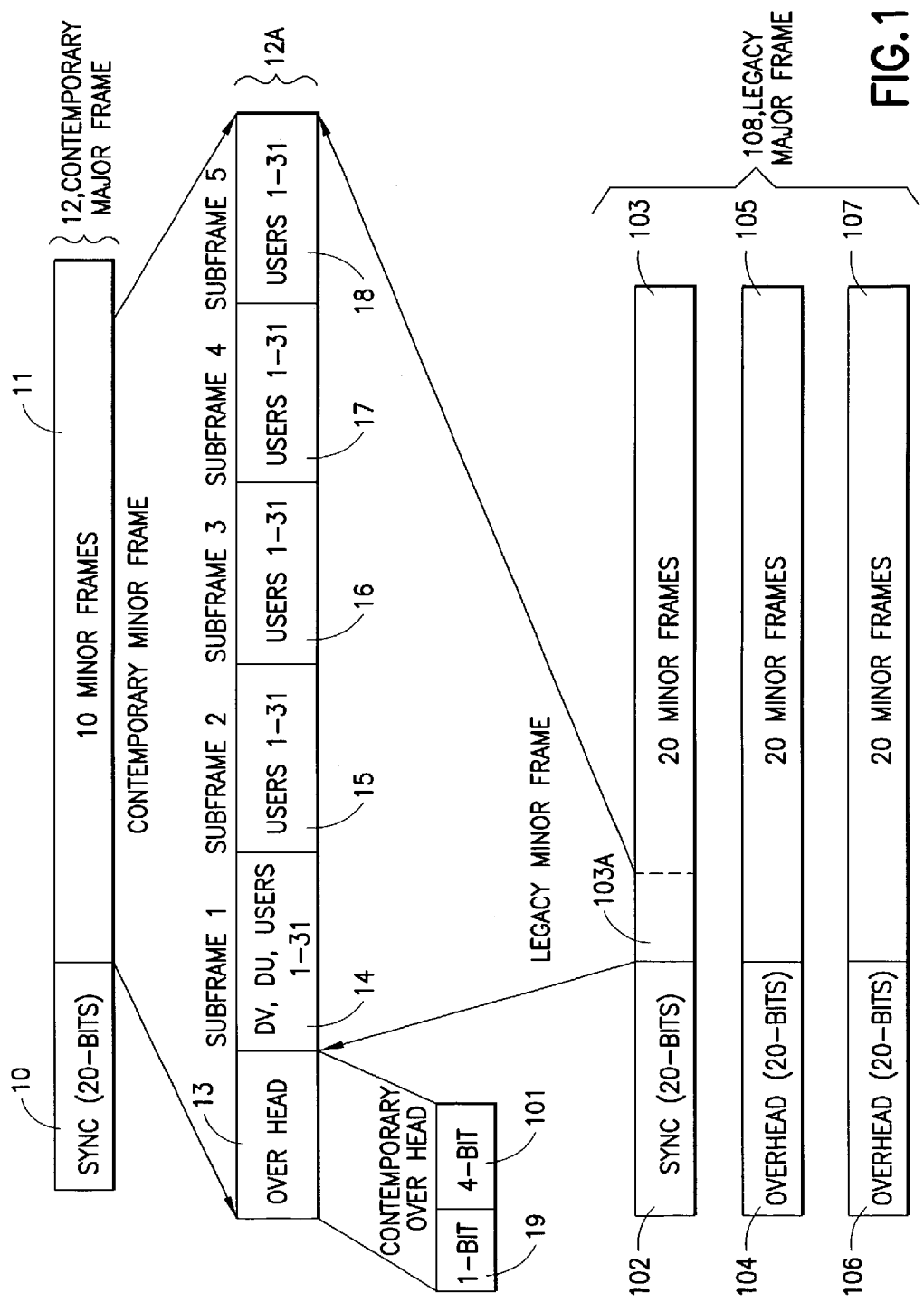
FIG. 1 is a diagram showing frame format relations between a contemporary format and a legacy format in accordance with features of the present invention.

The present invention will be described with reference to the embodiment shown in the drawings, however, it should be understood that the present invention could be embodied in many alternate forms of embodiments.

In accordance with known demultiplexer principles, a demultiplexer separates a serial data stream into its component fields. To accomplish this operation the demultiplexer must be synchronized with the incoming data stream. However, demultiplexer synchronization requires first acquiring a sync signal during a sync acquisition phase and thereafter maintaining synchronization.

Referring to FIG. 1, the first field in a contemporary framing format 12 incorporating features of the present invention is the sync word field 10. During sync acquisition the incoming signal is monitored until the 20-bit sync word field 10 is found. In alternate embodiments the sync word field may be any suitable bit length.

The next field in the contemporary framing format 12 is an overhead field 13. This field includes 1-bit field 19 for accumulation as well as 4-bits 101 for maintenance (also referred to as a 4-bit maintenance field). Referring also to FIG. 2, the data in the 1-bit field 19 may be accumulated by accumulator 24 once for each of the minor frames 11 shown in FIG. 1, to form a serial data stream 25. For example, FIG. 2 shows a serial data stream 25 formed from at least N accumulations of the 1-bit field 19, where N may be any suitable number. Within the serial data stream 25, the first field 25A may include another sync word, such as a 6-bit alternating Barker code (not shown). In alternate embodiments any suitable code may be used. The next field may contain an 8-bit command word 25B for commands such as telemetry control and/or information regarding bit error rates (BER), status, or cross-channel load. The last field may be a variable length data field 25C for conveying user or operational data. It will be appreciated that in alternate embodiments, the serial data stream 25 derived from the accumulated 1-bit overhead fields 19 may be any suitable length.

Referring again to FIG. 1, the next field following the overhead field 13 in the contemporary framing format is the first subframe 14 within the minor frame 11. The first subframe 14 contains a 2-bit field for digital voice (DV) and a 4-bit field for a dedicated user (DU). The first subframe 14 also contains sufficient capacity for storing remainder bits discussed below.

There may be up to 32 user indicator slots.

Figures 3B, 3C, 3D:
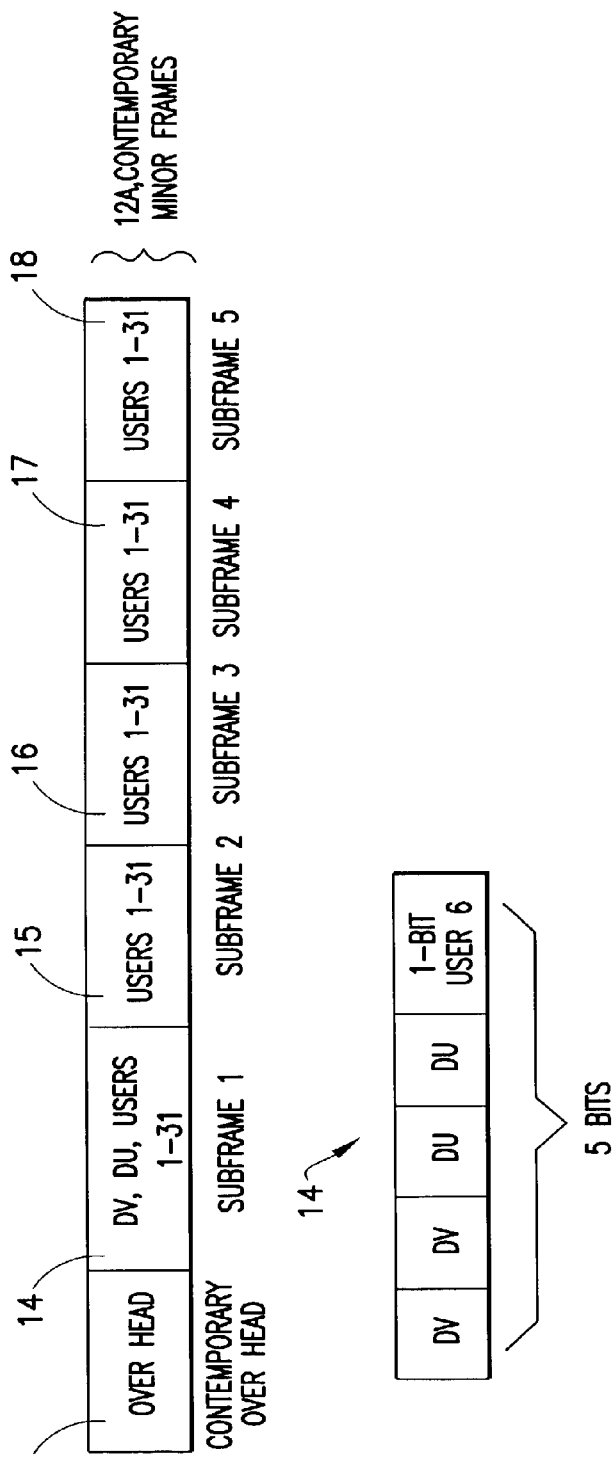
FIG. 3B is a user distribution of a subframe within a minor frame.
FIG. 3C is a diagram of a contemporary minor frame constructed in accordance with features of the present invention.
FIG. 3D is a diagram of another subframe within the minor frame.

Subframes 2-5, items 15-18, respectively, contain fields for user data. User data in subframes 2-5 is partitioned into equal bit groups per user per subframe 2-5 according to a desired bit rate per subframe. Any remainder is stored in the first subframe 14. For example, referring to FIG. 3A, a user group (User 1) desiring to transmit 576 kb/s may transmit 18 bits per subframe 2-5 (each bit represents 8 kb bandwidth). Notice there is no remainder to store in the first subframe 14. Referring still to FIG. 3A, User 6 transmits at 72 Kb/s. At 8 Kb bandwidth per bit transmission and equal distribution amongst subframes 2-5, this requires 2 bits per subframe 2-5 and a remainder bit stored in subframe 1. It will be appreciated that in alternate embodiments any suitable bandwidth per bit transmission and corresponding allocation of bits amongst subframes 2-5 may be used.

Referring to FIGS. 1 and 3B-3D, it will be seen that the subframes 1-5 each compose a legacy minor frame 103A, and when combined with the contemporary overhead field 13, compose the contemporary minor data frame 12A. Combining the contemporary sync field (FIG. 1, item 10) with the contemporary minor data frame 12A composes the contemporary major frame 12 shown in FIG. 1. Thus, it will be appreciated that building the contemporary major data frame 12 with minor frames similar to legacy minor frames (FIG. 1—item 103A) results in a contemporary format that is advantageously compatible with a legacy format, thereby facilitating communications between a legacy system and a contemporary system. It will also be appreciated that each contemporary major frame 12 may have any suitable number of minor frames 12A for desired transmission rates.

FIG. 4 shows a block diagram illustrating a multiplexer 41 having a legacy port device 42 coupled to a contemporary port device 44 through translator 43. Translator 43 translates the contemporary frame format (FIG. 1, item 12) to the legacy frame format (FIG. 1, item 108). It will be appreciated that the translator 43 also translates from the legacy frame format (FIG. 1, item 108) to the contemporary frame format (FIG. 1, item 12). It will also be appreciated that the multiplexer 41 in translating from one frame format to another appropriately pads frames where necessary. For example, referring to FIG. 1, the legacy format includes a sync field 102, two overhead fields 104, 106, and three groups of 20-minor frames 103, 105, 107. Thus, the translator may, for example, when translating from the legacy format having sixty minor frames between sync fields to the contemporary format having ten minor frames between sync fields, repeat the legacy sync field 102 six times, once for each group of 10 contemporary minor frames. The legacy overhead fields 104, 106 may be transmitted using the contemporary overhead field 13 described above.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A communication translator device comprising:
a first port configured to communicate a first data frame format, the first data frame format comprising:
at least one major data frame comprising:
X n-bit overhead fields, where one of the X n-bit overhead fields comprises a first sync field;
Y first minor frame groups, where each first minor frame group comprises a maximum of Z first minor frames, where each first minor frame comprises at least one subframe format, where X, Y, Z and n are integer variables;
a second port configured to communicate a second data frame format; and
a translator coupled between said first port and said second port, where said translator is configured to translate between the first data frame format and the second data frame format.

2. A communication translator device as in claim 1, where n=20; X=3; Y=3; and Z=20.

3. A communication translator device as in claim 1, where said second data frame format comprises:
a second sync field; and
a second minor frame group comprising ten second minor frames, each second minor frame comprising:
one 1-bit overhead field;
one 4-bit maintenance field; and
at least one subframe format.

4. A method for multiplexing and de-multiplexing multiple user data at high data rates while retaining backwards compatibility with legacy systems, said method comprising:
providing a first system configured to transmit and receive data in a first data frame format, where the first data frame format comprises:
at least one major data legacy-frame comprising:
X n-bit overhead fields, where one of the X n-bit overhead fields comprises a first sync field;
Y minor frame groups, where each minor frame group comprises a maximum of Z minor frames, where each minor frame comprises at least one legacy-subframe, where X, Y, Z and n are integer variables; and
providing a second system configured to transmit and receive data in a plurality of second data frame formats, where each of the plurality of second data frame formats comprises at least one contemporary-subframe, where the at least one contemporary-subframe is substantially identical to the at least one legacy-subframe.

5. A method as in claim 4, where n=20; X=3; Y=3; and Z=20.

6. A method as in claim 4, where each of the plurality of second data frame formats further comprises:
a 1-bit contemporary overhead subframe;
a 4-bit maintenance field; and
a 20-bit contemporary sync frame.

7. A method as in claim 4, further comprising:
for each contemporary data frame format, accumulating the 1-bit contemporary overhead frame containing a 1-bit overhead data bit to form an at least 2-bit overhead serial data stream; and
transmitting data comprising the at least 2-bit overhead serial data stream.

8. A method as in claim 7, where accumulating the 1-bit contemporary overhead frame further comprises:
accumulating the 1-bit contemporary overhead frame at least three times to form at least three fields, where each field comprises at least one bit.

9. A method as in claim 8, where accumulating the 1-bit contemporary overhead frame further comprises accumulating 1-bit contemporary overhead frame at least 15 times to form an at least 15-bit overhead serial data stream, the at least 15-bit serial data stream comprising:
a 6-bit second contemporary sync field;
an 8-bit command field; and
an at least 1-bit overhead data field.

* * * * *